United States Patent [19]

Kondo et al.

[11] Patent Number: 4,623,814

[45] Date of Patent: Nov. 18, 1986

[54] PIEZOELECTRIC HIGH-VOLTAGE GENERATING DEVICE

[75] Inventors: Kaneichi Kondo, Settu; Tooru Ninomiya, Neyagawa, both of Japan

[73] Assignee: Matsushita Electric Industrial Co., Ltd., Osaka, Japan

[21] Appl. No.: 801,313

[22] Filed: Nov. 25, 1985

[51] Int. Cl.[4] ............................................ H01L 41/08
[52] U.S. Cl. .................................................... 310/339
[58] Field of Search ...................... 310/339, 321, 323; 360/260; 431/130, 255

[56] References Cited

U.S. PATENT DOCUMENTS

| | | | |
|---|---|---|---|
| 2,944,204 | 7/1960 | Herbert | 310/339 X |
| 3,486,075 | 12/1969 | Steinke et al. | 310/339 X |
| 4,001,615 | 1/1977 | Berlincourt | 310/339 |
| 4,139,792 | 2/1979 | Kondo | 310/339 |

FOREIGN PATENT DOCUMENTS 2127824  4/1972  Fed. Rep. of Germany ...... 361/260

*Primary Examiner*—Mark O. Budd
*Attorney, Agent, or Firm*—Stevens, Davis, Miller & Mosher

[57] ABSTRACT

A high-voltage generating device comprising: an outer case; an anvil member, a piezoelectric element and a support member which are assembled together and held and fixed in the outer case by means of an adhesive; and an inner case slidably received in the outer case and accommodating therein, a striking mechanism including a striker and a striker spring. The improvement comprises that the element mounting space in the outer case has a volume which is at least 2.5 times as large as the volume of the piezoelectric element; and the adhesive filling the element mounting space is made of a plastic having a high bonding force and a high hardness. The piezoelectric element together with the anvil member and the support member are rigidly fixed in the outer case by the adhesive, so that the vibration of the piezoelectric element impacted by the striker is accompanied by resonance vibration of the adhesive and the outer case, the resonance vibration enhancing the vibration of the piezoelectric element and prolonging the period of duration of the vibration. In consequence, a high level of high-voltage energy and, hence, a high ignition energy are obtained such as to permit the manual effort for causing the impact to be reduced.

17 Claims, 10 Drawing Figures a=1.2 a=2.0 a=2.5 a=3.0

PIEZOELECTRIC HIGH-VOLTAGE GENERATING DEVICE

FIELD OF THE INVENTION

The present invention relates to a high-voltage generating device intended for use mainly in ignition or lighting of, for example, a cigarrette lighter. more specifically, the invention is concerned with an striking type high-voltage generator which has a piezoelectric element, an outer case accommodating a anvil member and a support member for holding the piezoelectric element, and an inner case accommodating a striking mechanism which includes a striker for striking the piezoelectric element and a striking spring.

BACKGROUND ART

High-voltage generating device of the type described has been broadly used mainly for ignition in cigarette lighters and so forth. In recent years, there is an increasing demand for this kind of device to operate with reduced force at higher ignition reiability, as well as to exhibit higher durability.

A conventional high-voltage generating device will be explained hereinunder with reference to FIGS. 1 to 3. As shown in FIGS. 1 and 2, the high-voltage generating device has an outer case 1 in which is defined a bore 1a for accommodating a piezoelectric element and having a volume which is about 1.2 times as large as the volume of the piezoelectric element. The piezoelectric element 2 together with an anvil member 3 is inserted into this bore 1a through an element insertion hole 1b formed in the side bottom surface of the outer case 1, and a support member 4 is inserted into the bore 1a through a top opening in the outer case 1. Then a pressing spacer 5 is inserted into the bore 1a such as to firm the contact between the piezoelectric element 2, anvil member 3 and the support member 4. In this state, an adhesive 6 which has a comparatively low bonding strength and setting hardness, e.g., a silicon resin, is charged into the bore such as to fix the piezoelectric element 2 together with the anvil member 3 and the support member 4. A return spring 7 is loaded in a space 1c within the outer case 1 on the front side of the anvil member 3 and, thereafter, an inner case 11, which accommodating a striking mechanism including a striking spring 10, striking pin 8 and a striker 9, is slidably inserted into the outer case, thus completing the assembly of the high-voltage generating device. For further detail of this known device, a reference shall be made to Japanese Utility Model Laid-Open Nos. 142558/1983 and 124856/1984.

The operation of this known high-voltage generating device is as follows. As the inner case 11 in the outer case 1 is slided in the direction of an arrow B overcoming the force of the return spring 7, striking energy is stored in the striker 9 because the striker pin 8 is engaged by a cam formed in the case 1. As the inner case 11 is further slided, the striker pin 8 secured to the striker 9 is disengaged from the cam on the outer case 1, by the action of a cam which is formed in the inner case 11. In consequence, the striker 9 strikes the anvil member 3 by the energy stored therefor.

In consequence, an impact strain is caused in the piezoelectric element 2 so that the latter generates a high voltage. This high voltege is supplied through a high-voltage lead (not shown) connected to the support member 4 to a discharge gap, such as to ignite, for example, the fuel of a cigarette lighter. Then, as the outer case 1 is released from the pressing force, the inner case 11 is returned to the initial position together with the striker 9 by the force of the return spring 7.

In this known high-voltage generating device, the adhesive 6 for insulating the piezoelectric element 2 and fixing the same to the outer case 1 is made of, for example, a silicon resin having comparatively low bonding strength and setting hardness. In addition, the layer of the adhesive covering the piezoelectric element is extremely thin, and the outer case 1 is made of a polypropylene or an ABS resin which contains no reinforcement agent and which exhibits only a small affinity to the adhesive. In consequence, when the impact is applied, only the piezoelectric element 2 is vibrated for a short period $T_1$ as shown in FIG. 3, so that only a small discharge area is available as shown by hatched area in FIG. 3. In addition, this known device does not exhibit high durability bacause of small adhesive layer thickness and small bonding strength.

When this high-voltage generating device is mounted in a cigarrette lighter for example, it is necessary that the high-voltage lead is connected to the support member 4 in order to deliver the high-voltage generated by the piezoelectric element to the outside and that the connecting portion is electrically insulated. This inconveniently impairs the handling of the cigarrette lighter.

In view of the above-described problems of the prior art, the present invention aims at providing a high-voltage generating device which is capable of converting an impact energy imparted to the piezoelectric element into electric energy at a high efficiency such as to obtain a high energy, thereby attaining a high ignition reliability and easy operation, as well as a high durability and easy pick-up of the high voltage generated by the piezoelectric element.

DISCLOSURE OF THE INVENTION

To this end, according to the invention, there is provided a high-voltage generating device comprising: an outer case; an anvil member, a piezoelectric element and a support member which are assembled together and held and fixed in the outer case by means of an adhesive; and an inner case slidably received in the outer case and accommodating a striking mechanism including a striker and a striker spring, wherein the improvement comprises that the element mounting space in the outer case has a volume which is at least 2.5 times as large as the volume of the piezoelectric element; and the adhesive filling the element mounting space is made of a plastic having a high bonding force and a high hardness.

In the high-voltage generating device of the invention, therefore, the piezoelectric element is rigidly bonded to the anvil member, support member and the outer case, so that the vibration of the piezoelectric member is followed by resonance vibration of the outer case through the intermediary of the adhesive. The resonance vibration enhances the vibration of the piezoelectric element and prolongs the period of the vibration, so that the ignition energy of the high-voltage generating device can be increased advantageously. The generation of high ignition energy in turn reduces the manual effort to be exerted for the operation of the device. This advantageous effect will be enhanced if the outer case is made from a plastic which is reinforced with glass fibers for attaining higher rigidity.

The invention also ensures a higher durability of the device by virture of the increased thickness of the adhesive layer and the increased bonding strength of the same. The mounting of this high-voltage generating device will be facilitated and the reliability of delivery of the electric energy to the discharge gap and, hence, the reliability of the ignition will be enhanced, if the high-voltage lead is electrically connected to the support member within the outer case.

THE BEST MODE FOR CARRYING OUT THE INVENTION

Figure 1:
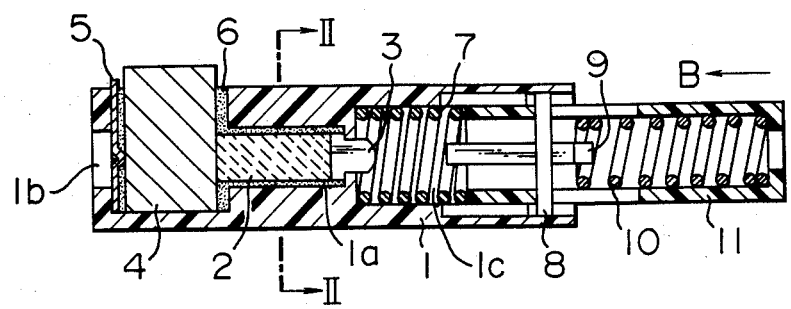
FIG. 1 is a sectional view of a known high-voltage generating device.
Figure 2:
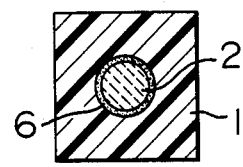
FIG. 2 is a sectional view taken along the line A—A' of FIG. 1.

The invention will be described in detail hereinunder with reference to FIGS. 4 to 6. In these Figures, the same reference numerals are used to denote the same parts or members as those in the known arrangement and detailed description thereof is omitted. The description of principle of operation mechanism for generating high voltage is also omitted because it is materially identical to that in the known device explained before.

Figure 4:
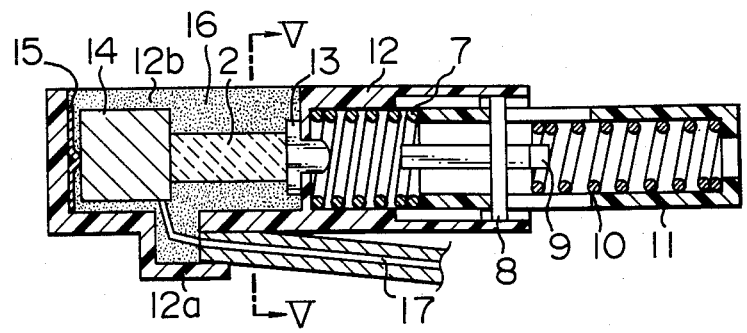
FIG. 4 is a sectional view of an embodiment of a high-voltage generating device in accordance with the invention.
Figure 5:
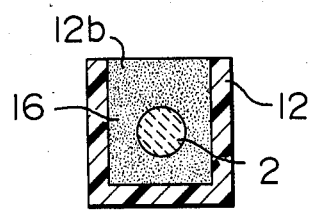
FIG. 5 is a sectional view taken along the line C—C' of FIG. 4.
Figure 6:
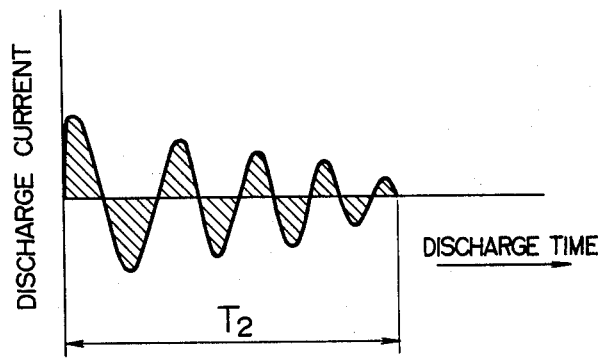
FIG. 6 is a waveform chart showing the waveform of discharge current in the high-voltage generating device of the invention.

Referring to FIGS. 4 and 5, a reference numeral 12 denoted an outer case having an opening in the upper side thereof and provided in the underside thereof with a boss 12a through which a later-mentioned high-voltage lead 17 for taking out the high voltage is led. The outer case 12 is made of a plastic material such as polyamide, polyacetal, polycarbonate or the like which is reinforced with glass fibers and, therefore, exhibits a high regidity. An element mounting space 12b for housing a piezoelectric element together with an anvil member 13 and a support member 14 is formed in the outer case 12. The space 12b has a volume which is at least 2.5 times as large as the volume of the piezoelectric element 2. As in the case of the known device, an inner case 11 accommodating a striking mechanism is slidably received in the outer case 12 with a return spring 7 acting therebetween. The piezoelectric element 2 is fitted in element the outer case 12 through the element mounting space 12b through the above-mentioned opening formed in the upper side of the outer case 12. An anvil member 13 and a support member 14 which are arranged on both sides of the piezoelectric element are also inserted from the upper side of the outer case 12 through the opening. The anvil member 13 and the support member 14 have outside diameters greater than that of the piezoelectric element 2. A reference numeral 15 designates a resilient tabular pressing spacer which resiliently urges the anvil member 14 making into tight-contact with the piezoelectric element 2. The entire portion of the pressing spacer 15 is embedded in an adhesive which fills the element mounting space 12b. The adhesive filling the element mounting space 12b rigidly bonds the piezoelectric element 12, anvil member 13 and the support member 14 to the wall of the outer case 12. Preferably, the adhesive 16 is made of a thermosetting resin and essentially has a high bonding force and high hardness. Examples of such resin are thermosetting epoxy resins such as Araldite produced by Ciba-Geigy Co. (Japan) and Stycast produced by Emerson and Cumming Co. (Japan).

The support member 14 is entirely embedded in the adhesive 16. A high-voltage lead 17 is connected to a portion of the underside of the support member 14. The arrangement is such that electric contact between the support member 14 and the high-voltage leads is maintained by the adhesive filled in the element mounting space. The high-voltage lead 17 electrically connected at its one end to the support member 14 leads outside the outer case through the aforementioned boss 12a formed on the underside of the outer case 12.

Thus, in the high-voltage generating device of the invention, the outer case 12 is made of a highly rigid plastic material reinforced with glass fibers. The element mounting space 12b in the outer case 12 has a volume which is at least 2.5 times as large as the volume of the piezoelectric element 2. In addition, the adhesive filled in the space after mounting the piezoelectric element 2 and other associated members is made of a resin which has a high bonding force and a high hardness. Thus, all the elements such as the outer case 12, anvil member 13, piezoelectric element 2, support member 14 and the pressing spacer are held together to form a rigid united body.

Therefore, when an impact is given by the striker 9, the piezoelectric element 2 vibrates while being accompanied by resonance vibration of the outer case 12 and the adhesive 16, so that a large vibration amplitude is obtained efficiently. In addition, the vibration lasts for several cycles as will be seen from the waveform chart shown in FIG. 6, so that the overall discharging period $T_2$ is prolonged, thereby assuring a greater discharge energy as shown by the hatched area in FIG. 6.

Figure 3:
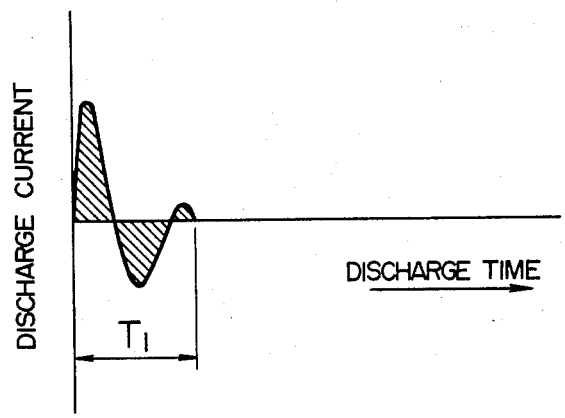
FIG. 3 is a waveform chart showing the waveform of discharge current in the known high-voltage generating device.

It was confirmed that, when one of the essential features or requirements of the invention is not met, e.g., when the volume of the element mounting space is less than 2.5 times as large as the volume of the piezoelectric element or when the adhesive used has comparatively small boding force and hardness, the discharge characteristic is deteriorated as shown in FIG. 3, thus making it impossible to attain the high discharge energy promised by the present invention.

Figure 7A:
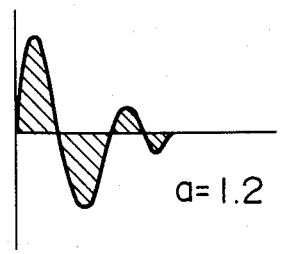
FIGS. 7A, 7B, 7C, and 7D are graphs showing the waveforms of discharge currents as obtained in the high-voltage generating device of the invention with various volume retios between the piezoelectric element and the element housing space in an outer case.
Figure 7B:
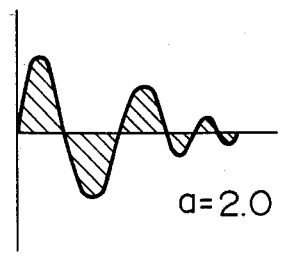
Figure 7C:
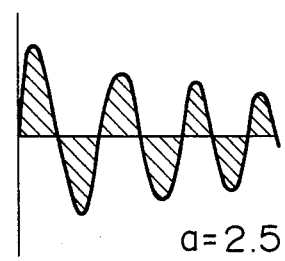
Figure 7D:
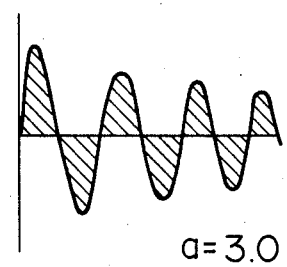

FIGS. 7A, 7B, 7C and 7D illustrate how the waveform of the discharge current varies with variation in the ratio a between the volume of the piezoelectric element 2 and the volume of the element mounting space 12b in the outer case 12, when the same impact is applied to the piezoelectric element. More specifically, FIG. 7A shows the case where the ratio a is selected to be 1.2 which is substantially equal to that in the conventional device. In this case, therefore, the waveform of the discharge current is substantially the same as that shown in FIG. 3 which is obtained with the known device. FIG. 7B shows the case where the ratio a is selected to be 2.0. In this case, the discharge energy is higher than that shown in FIG. 7, but is still unsatisfactory. In addition, the discharge current waveform is changed to that shown in FIG. 7A after 10,000 impact cycles. This means that the arrangement in which the ratio a is selected to be 2.0 is still unsatisfactory also in the durability. FIGS. 7C and 7D show the waveforms of discharge current as obtained when the volumetric ratio a is selected to be 2.5 and 3.0, respectively, thus falling within the range specified by the present invention. In both cases, high levels of discharge energy which are substantially equal to each other were attained. In each of these cases, the discharge current waveforms was changed to that shown in FIG. 7A after 100,000 impact cycles, thus providing excellent durability. It will be understood that, since the effects in the improvement in the discharge current waveform and the durability are the same both in the cases where the volumetric ratio a is 2.5 and 3.0, those effects are saturated at a certain level and it is meaningless to increase the ratio a uselessly beyond this saturation level.

Tests were conducted using materials with no glass-fiber reinforcement or materials which are comparatively flexible, e.g., polypropylene, as well as tests which were conducted using the anvil member 13 and the support member 14 having diameters equal to or smaller than that of the piezoelectric element 2. The results of these tests showed much improved discharge current waveforms and durability over the known device, although the discharge current waveforms were somewhat inferior to those shown in FIGS. 7C and 7D.

As will be understood from the foregoing description, it is possible to obtain higher efficiency of generation of high-voltage energy, i.e., to obtain greater high-volt energy by the same level of impact energy as compared with the known device. This means that the energy of impact for obtaining the required high-voltage energy can be reduced as compared with the known device. This in turn permits the operation of the high-voltage generating device with reduced manual effort.

The enhanced bonding force and the increased thickness of the adhesive layer offer higher durability. Since the high-voltage lead for taking out the high voltage is electrically connected to the support member 14 within the outer case 12, the high-voltage generating device as a whole can easily be mounted in the cigarette lighter and the high-voltage is delivered to the igniting portion without fail, thus assuring a high ignition reliability.

INDUSTRIAL APPLICABILITY

As has been described, in the high-voltage generating device of the invention, the element mounting space in the outer case for mounting the piezoelectric element has a volume which is at least 2.5 times as large as the volume of the piezoelectric element, and the vacant space in the element mounting space after mounting the piezoelectric element and other associated members is filled with an adhesive having a highbonding strength and a high setting hardenss. Therefore, the piezoelectric element is rigidly held in the outer case together with the anvil member and the support member, so that the vibration of the pirzoelectric element is accompanied by resonant vibration of the adhesive and the outer case, the resonance vibration including further vibration of the piezoelectric element thus prolonging the period of duration of the vibration of the same, thus producing a high ignition energy. This in turn permits the high-voltage generating device to be operated with reduced manual power. This advantageous effect is further enhanced by using a highly rigid plastic material reinforced with glass fibers as the material of the outer case. In addition, the durability of the high-voltage generating device is also improved by virture of the enhanced bonding strength and the increased thickness of the adhesive layer. Furthermore, by electrically contacting and connecting the high-voltage lead to the support member within the outer case, the mounting of the high-voltage generating device in, for example, a cigarette lighter is facilitated and the delivery of the high-voltage to the igniting portion is made without fail, thus assuring a high ignition reliability.

The high-voltage generating device in accordance with the invention can be used for various purposes such as ignition of fuel in cigarette lighters as described or in burning devices using a gas as the fuel, remote control oscillators and other devices which require high voltage pulses.

What is claimed is:

1. A high-voltage generating device comprising: an outer case; an anvil member, a piezoelectric element and a support member which are assembled together and held and fixed in said outer case by means of an adhesive; and an inner case slidably received in said outer case and accommodating a striking mechanism including a strike and a striker spring, wherein the improvement comprises that the element mounting space in said outer case has a volume which is at least 2.5 times as large as the volume of said piezoelectric element; and that said adhesive filled in said element mounting space is made of a plastic having a high bonding force and a high hardness.

2. A high-voltage generating device according to claim 1, wherein said outer case is made of a highly rigid plastic material reinforced with glass fibers.

3. A high-voltage generating device according to claim 1, wherein said adhesive having a high bonding force and a high hardness is a thermosetting epoxy resin.

4. A high-voltage generating device according to claim 1, wherein said anvil member and said support member disposed on both sides of said piezoelectric element have outside diameters greater than the outside diameter of said piezoelectric element.

5. A high-voltage generating device according to claim 1, wherein a piezoelectric element is inserted into said outer case through an opening formed in the upper wall of said outer case.

6. A high-voltage generating device according to claim 1, wherein said support member is entirely embedded in said adhesive consisting of a plastic having a high bonding force and a high hardness, and wherein a high-voltage lead leading outside said outer case is kept in contact with said support member embedded in said adhesive.

7. A high-voltage generating device according to claim 1, wherein said piezoelectric element is inserted into said outer case through an opening formed in the upper side of said outer case, said anvil member and said support member having outside diameters greater than that of said piezoelectric element, said anvil member being entirely embedded in said adhesive consisting of a plastic having a high bonding force and a high hardness, said support member being contacted at a portion thereof by a high-voltage lead which extends outside said outer case through an opening forced in the underside of said outer case.

8. A high-voltage generating device comprising: an outer case; an anvil member, a piezoelectric element and a support member which are assembled together and held and fixed in said outer case by means of an adhesive; and an inner case slidably received in said outer case and accommodating a striking mechanism including a striker and a striker spring, wherein the improvement comprises that the element mounting space in said outer case has a volume which is at least 2.5 times as large as the volume of said piezoelectric element; that said outer case is made of a highly rigid plastic material reinforced with glass fibers; and that said adhesive being filled in said element mounting space is made of a plastic having a high bonding force and a high hardness.

9. A high-voltage generating device according to claim 8, wherein said adhesive having a high bonding force and a high hardness is a thermosetting epoxy resin.

10. A high-voltage generating device according to claim 8, wherein said anvil member and said support member disposed on both sides of said piezoelectric element have outside diameters greater than the outside diameter of said piezoelectric element.

11. A high-voltage generating device according to claim 8, wherein a piezoelectric element is inserted into said outer case through an opening formed in the upper wall of said outer case.

12. A high-voltage generating device according to claim 8, wherein said support member is entirely embedded in said adhesive consisting of a plastic having a high bonding force and a high hardness, and wherein high-voltage lead leading outside said outer case is kept in contact with said support member embedded in said adhesive.

13. A high-voltage generating device according to claim 8, wherein said piezoelectric element is inserted into said outer case through an opening formed in the upper side of said outer case, said anvil member and said support member having outside diameters greater than that of said piezoelectric element, said anvil member being entirely embedded in said adhesive consisting of a plastic having a high bonding force and a high hardness, said support member being contacted at a portion thereof by a high-voltage lead which extends outside said outer case through an opening forced in the underside of said outer case.

14. A high-voltage generating device comprising: an outer case; an anvil member, a piezoelectric element and a support member which are assembled together and held and fixed in said outer case by means of an adhesive; and an inner case slidably received in said outer case and accommodating a striking mechanism including a striker and a striker spring, wherein the improvement comprises that the element mounting space in said outer case has a volume which is at least 2.5 times as large as'the volume of said piezoelectric element, said piezoelectric element being inserted into said outer case through an opening forced in the upper side thereof; that said outer case is made of a highly rigid plastic material reinforced with glass fibers; and that said adhesive filled in said element mounting space is made of a thermosetting epoxy resin having a high bonding force and a high hardness.

15. A high-voltage generating device according to claim 14, wherein said support member is entirely embedded in said adhesive consisting of a thermosetting epoxy resin having a high bonding force and a high hardness, and wherein a high-voltage lead leading outside said outer case is kept in contact with said support member embedded in said adhesive.

16. A high-voltage generating device according to claim 14, wherein said piezoelectric element is inserted into said outer case through an opening formed in the upper side of said upper case, said anvil member and said support member having outside diameters greater than that of said piezoelectric element, said anvil member being entirely embedded in said adhesive consisting of a thermosetting epoxy resin having a high bonding force and a high hardness, said support member being contacted at a portion thereof by a high-voltage lead which extends outside said outer case through an opening forced in the underside of said outer case.

17. A high-voltage generating device comprising: an outer case; an anvil member, a piezoelectric element and a support member which are assembled together and held and fixed in said outer case by means of an adhesive; and an inner case slidably received in said outer case and accommodating a striking mechanism including a striker and a striker spring, wherein the improvement comprises that the element mounting space in said outer case has a volume which is at least 2.5 times as large as the volume of said piezoelectric element, said piezoelectric element being inserted into said outer case through an opening forced in the upper side thereof; that said anvil member and said support member disposed on both sides of said piezoelectric element having outside diameters greater than that of said piezoelectric element; that said outer case is made of a highly rigid plastic material reinforced with glass fibers; that said adhesive filled in said element mounting space is made of a thermosetting epoxy resin having a high bonding force and a high hardness, said adhesive in which said anvil member is embedded with its entirety; and that a high-voltage lead electrically contacting said anvil member being extended outside said outer case through an opening formed in the underside of said outer case.

* * * * *